(12) United States Patent
Nakagawa (10) Patent No.: US 11,739,791 B2
(45) Date of Patent: Aug. 29, 2023

(54) BALL JOINT AND DUST COVER

(71) Applicant: NOK CORPORATION, Tokyo (JP)

(72) Inventor: Keisuke Nakagawa, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 68 days.

(21) Appl. No.: 16/975,474

(22) PCT Filed: Sep. 30, 2019

(86) PCT No.: PCT/JP2019/038575
§ 371 (c)(1),
(2) Date: Aug. 25, 2020

(87) PCT Pub. No.: WO2020/075558
PCT Pub. Date: Apr. 16, 2020

(65) Prior Publication Data
US 2021/0018038 A1    Jan. 21, 2021

(30) Foreign Application Priority Data

Oct. 11, 2018  (JP) .................................. 2018-192386

(51) Int. Cl.
*F16C 11/06*  (2006.01)
(52) U.S. Cl.
CPC .......... *F16C 11/0671* (2013.01); *Y10T 403/31* (2015.01)
(58) Field of Classification Search
CPC .............. F16C 11/0666; F16C 11/0671; F16C 11/0676; F16J 3/041; F16J 3/042;
(Continued)

(56) References Cited

U.S. PATENT DOCUMENTS 3,279,834 A * 10/1966 Budzynski ............... F16J 15/52
403/51
3,404,909 A * 10/1968 Gottschald ............... F16J 3/042
277/635
(Continued)

FOREIGN PATENT DOCUMENTS

DE      4413664 A1 * 12/1994  ............... B62D 7/16
DE      4420488 A1 * 12/1995  .......... F16C 11/0638
(Continued)

OTHER PUBLICATIONS

Translated Description of WO 2017/086142 A1. Hirota, Takuma. Dust Cover and Sealing Structure. May 26, 2017.*
(Continued)

*Primary Examiner* — Josh Skroupa
*Assistant Examiner* — Kevin J Baynes
(74) *Attorney, Agent, or Firm* — Greenblum & Bernstein, P.L.C.

(57) ABSTRACT

A ball joint and a dust cover in which a stable sealing function can be provided even when a space for disposing the dust cover is small are provided. The dust cover includes a deformable body portion, a fixed portion which is provided on one end side of the body portion and is fixed to a socket, and a seal portion provided on the other end side of the body portion. The seal portion has a main seal part which is provided to be slidable relative to a spherical portion side flange and an opposite side flange while sandwiched therebetween. The maximum length of the main seal part in a central axis direction in a state in which no external force is applied thereto is longer than a distance between opposing surfaces of the spherical portion side flange and the opposite side flange, where the central axis direction is a direction in which a central axis of the dust cover extends in a state in which no external force is applied thereto.

5 Claims, 6 Drawing Sheets

(58) Field of Classification Search
CPC . F16J 3/048; F16J 15/52; F16J 15/525; Y10T 403/31; Y10T 403/315; Y10T 403/32729; F16D 3/845; F16D 3/848; F16D 2003/846
USPC .................................................. 464/173–175
See application file for complete search history.

(56) References Cited

U.S. PATENT DOCUMENTS

| | | | | |
|---|---|---|---|---|
| 4,154,546 A * | 5/1979 | Merrick | ................ | F16C 11/068 |
| | | | | 277/928 |
| 4,241,928 A * | 12/1980 | Nemoto | ............. | F16C 11/0676 |
| | | | | 277/635 |
| 5,601,378 A * | 2/1997 | Fukukawa | .......... | F16C 11/0638 |
| | | | | 403/135 |
| 5,697,142 A * | 12/1997 | Sugiura | ............... | F16C 11/0633 |
| | | | | 403/126 |
| 5,725,433 A * | 3/1998 | Kudo | ....................... | F16D 3/845 |
| | | | | 464/175 |
| 6,139,788 A * | 10/2000 | Dorr | ........................ | F16C 7/026 |
| | | | | 264/263 |
| 6,652,179 B2 * | 11/2003 | De Freitas | ................ | F16D 1/12 |
| | | | | 277/635 |
| 6,866,441 B2 * | 3/2005 | Yokoyama | .......... | F16C 11/0671 |
| | | | | 403/122 |
| 8,328,650 B2 * | 12/2012 | Takabe | .................... | F16D 3/845 |
| | | | | 464/175 |
| 8,414,215 B2 * | 4/2013 | Langendoen | ....... | F16C 11/0671 |
| | | | | 277/635 |
| 8,905,417 B2 * | 12/2014 | Kuroda | ............... | F16C 11/0638 |
| | | | | 280/124.152 |
| 11,041,524 B2 * | 6/2021 | Kuroda | ............... | B60G 21/0551 |
| 2007/0166096 A1 * | 7/2007 | Lim | .................... | F16C 11/0671 |
| | | | | 403/50 |
| 2008/0038051 A1 * | 2/2008 | Broker | ................ | F16C 11/0671 |
| | | | | 403/134 |
| 2009/0047063 A1 | 2/2009 | Shirai et al. | | |
| 2012/0148336 A1 | 6/2012 | Shimazawa | | |
| 2013/0121754 A1 * | 5/2013 | Kuroda | ................... | F16C 11/06 |
| | | | | 403/122 |
| 2013/0287478 A1 * | 10/2013 | Shibata | .................. | B62D 7/166 |
| | | | | 403/134 |
| 2015/0217614 A1 * | 8/2015 | Aoki | ....................... | F16C 33/20 |
| | | | | 403/133 |
| 2018/0347621 A1 | 12/2018 | Hirota | | |

FOREIGN PATENT DOCUMENTS

| | | | | |
|---|---|---|---|---|
| DE | 102009031290 | | 1/2011 | |
| EP | 1852617 A1 * | 11/2007 | ......... | F16C 11/0671 |
| EP | 1865212 A1 * | 12/2007 | ............... | F16J 3/042 |
| EP | 2698267 | | 2/2014 | |
| EP | 2816245 | | 12/2014 | |
| JP | 61228114 A * | 10/1986 | .......... | F16C 11/0666 |
| JP | H07-10543 U | | 2/1995 | |
| JP | 2012-102840 A | | 5/2012 | |
| WO | WO 2006/098124 A1 | | 9/2006 | |
| WO | 2011/049012 A1 | | 4/2011 | |
| WO | WO-2017061212 A1 * | 4/2017 | ......... | F16C 11/0671 |
| WO | WO 2017/086142 A1 | | 5/2017 | |

OTHER PUBLICATIONS

Translated Description of JP 2012102840 A. Shimazawa, Toshihiro. Dust Cover for Ball Joint. May 31, 2012.*
Japanese Office Action for corresponding Application No. 2020-550427 dated Jul. 13, 2021.
ISR for PCT/JP2019/038575, dated Dec. 17, 2019.

* cited by examiner

BALL JOINT AND DUST COVER

TECHNICAL FIELD

The present disclosure relates to a ball joint and a dust cover which are provided in a vehicle or the like.

BACKGROUND ART

Conventionally, a dust cover is used for a ball joint provided in various devices such as a vehicle in order to prevent water, dust, and the like from entering a joint portion and prevent grease from flowing out of the joint portion. In such a dust cover, in order to provide a stable sealing function, when a ball stud swings relative to a socket that constitutes a ball joint, a body portion of the dust cover is desired to be deformed to follow it and there needs to be no gap formed in a seal portion.

However, in recent years, due to a trend of miniaturization of devices in addition to increase in a swing angle of a ball stud relative to a socket, a space for placing a dust cover can be narrow, and thus it may be difficult to meet the above mentioned desire with conventional structures.

CITATION LIST

Patent Literature

[PTL 1]
Japanese Patent Application Publication No. 2012-102840
[PTL 2]
Japanese Utility model Application Publication No. H07-10543

SUMMARY OF INVENTION

Technical Problem

An object of the present disclosure is to provide a ball joint and a dust cover which can provide a stable sealing function even when a space for disposing a dust cover is narrow.

Solution to Problem

The present disclosure employs the following means in order to achieve the object.

That is, a ball joint of the present disclosure is a ball joint including:
a ball joint main body including
a ball stud which has a shaft and a spherical portion at one end of the shaft,
a socket which has a bearing for the spherical portion and supports the ball stud to be rotatable and swingable, and
a coupling member which is coupled to the shaft on a side opposite to the spherical portion; and
a dust cover attached to the ball joint main body, wherein
the shaft is provided with
a spherical portion side flange provided on a spherical portion side and
an opposite side flange provided on a side opposite to the spherical portion side across the spherical portion side flange,
the dust cover includes
a deformable body portion,
a fixed portion which is provided on one end side of the body portion and is fixed to the socket, and
a seal portion provided on the other end side of the body portion,
the seal portion has a main seal part which is provided to be slidable relative to the spherical portion side flange and the opposite side flange while sandwiched therebetween, and
a maximum length of the main seal part in a central axis direction in a state in which no external force is applied thereto is longer than a distance between opposing surfaces of the spherical portion side flange and the opposite side flange, where the central axis direction is a direction in which a central axis of the dust cover extends in a state in which no external force is applied thereto.

The dust cover of the present disclosure is a dust cover configured to be attached to a ball joint main body,
the ball joint main body including
a ball stud which has a shaft and a spherical portion at one end of the shaft,
a socket which has a bearing for the spherical portion and supports the ball stud to be rotatable and swingable, and
a coupling member which is coupled to the shaft on a side opposite to the spherical portion,
the shaft being provided with
a spherical portion side flange provided on a spherical portion side and
an opposite side flange provided on a side opposite to the spherical portion side across the spherical portion side flange, and
the dust cover including
a deformable body portion,
a fixed portion which is provided on one end side of the body portion and is fixed to the socket, and
a seal portion provided on the other end side of the body portion, wherein
the seal portion has a main seal part which is provided to be slidable relative to the spherical portion side flange and the opposite side flange while sandwiched therebetween, and
a maximum length of the main seal part in a central axis direction in a state in which no external force is applied thereto is longer than a distance between opposing surfaces of the spherical portion side flange and the opposite side flange, where the central axis direction is a direction in which a central axis of the dust cover extends in a state in which no external force is applied thereto.

According to these disclosures, since the main seal part of the dust cover is configured to be sandwiched between the spherical portion side flange and the opposite side flange provided on the shaft of the ball stud, a sealing function thereof can be achieved even when a space of a portion with which the main seal part is in close contact is narrow.

The main seal part may include
a pair of inner circumferential surface side seal protrusions which protrude radially inward and come into slidable contact with an outer circumferential surface of the shaft, and
an end surface side seal protrusion which protrudes toward the opposite side flange and comes into slidable contact with an end surface of the opposite side flange.

This provides sealing function at both locations between the inner circumferential surface side seal protrusions and the outer circumferential surface of the shaft and between the end surface side seal protrusion and the end surface of the opposite side flange. In addition, since the main seal part is sandwiched between the spherical portion side flange and the opposite side flange provided on the shaft of the ball stud, separation of the inner circumferential surface side seal protrusions from the outer circumferential surface of the shaft is prevented, and separation of the end surface side seal protrusion from the end surface of the opposite side flange is prevented. Further, since the pair of inner circumferential surface side seal protrusions are provided, a space is formed between the pair of inner circumferential surface side seal protrusions, and accordingly, even when the main seal part is sandwiched between the spherical portion side flange and the opposite side flange, the inner circumferential surface side seal protrusions can be deformed to escape into the space. Therefore, deterioration of a sealing performance due to abnormal deformation of the main seal part can be inhibited.

An annular concave may be provided on an outer circumferential surface of the seal portion.

The annular concave can inhibit abnormal deformation of the dust cover when the dust cover is deformed such that an outer circumferential surface side part of the body portion on and the outer circumferential surface of the seal portion come closer to each other as the ball stud swings relative to the socket.

The seal portion may have a contact part between the main seal part and the body portion, the contact part having an inner diameter smaller than an outer diameter of the spherical portion side flange in a state in which no external force is applied thereto and being configured to come into slidable contact with an outer circumferential surface of the spherical portion side flange.

This achieves more stable sealing performance.

The above configurations may be employed in combination where possible.

Advantageous Effects of Invention

According to the present disclosure, a stable sealing function can be provided even when a space for disposing a dust cover is narrow.

DESCRIPTION OF EMBODIMENTS

An embodiment for implementing the present disclosure will be illustrated below in detail with reference to the figures. However, dimensions, materials, shapes, relative positions, and the like of the components described in the present embodiment are not intended to limit the scope of the present disclosure thereto unless otherwise specified.

Embodiment

With reference to FIGS. 1 to 6, a ball joint and a dust cover according to an embodiment of the present disclosure will be described. The ball joint is provided in any of various devices such as a vehicle. In the following description, a direction in which a central axis of the dust cover extends in a state in which no external force is applied thereto is referred to as a "central axis direction."

<Ball Joint>

Figure 1:
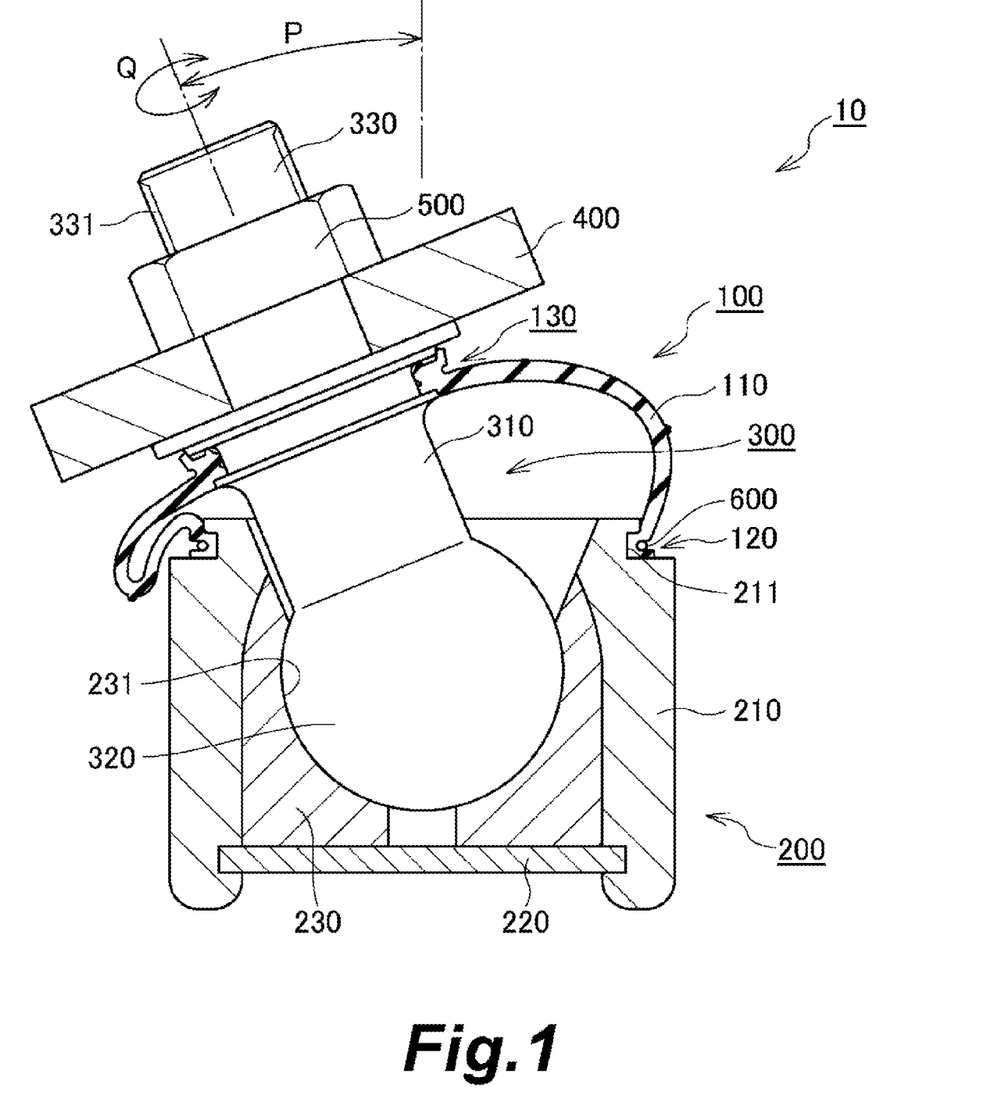
FIG. 1 is a schematic cross-sectional view of a ball joint according to an embodiment of the present disclosure.
Figure 2:
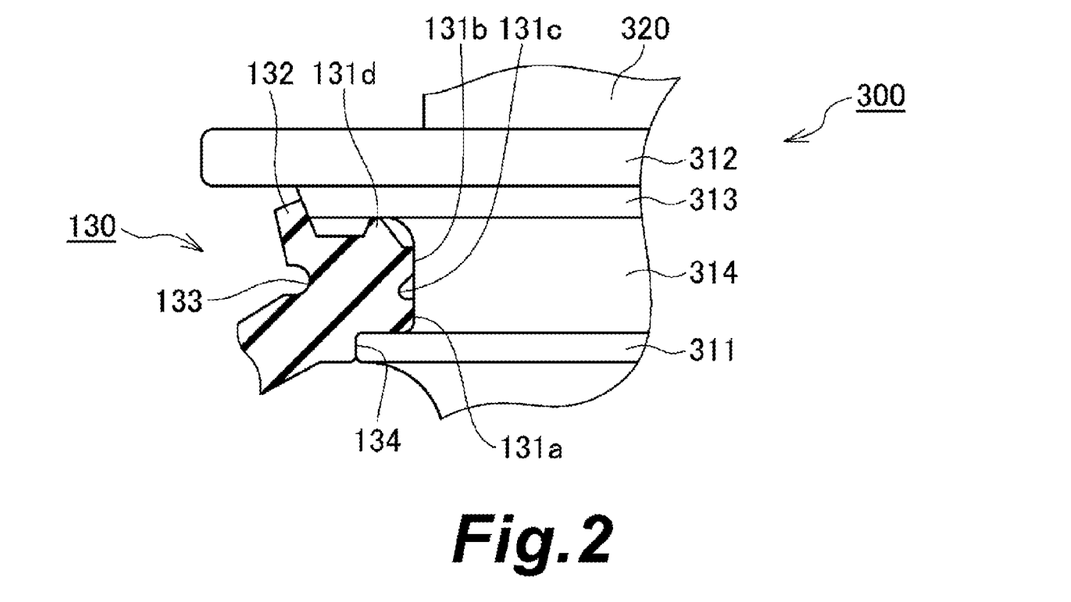
FIG. 2 is a partially enlarged cross-sectional view of the ball joint according to the embodiment of the present disclosure.

With reference to FIGS. 1 and 2, an overall configuration and the like of the ball joint will be described. FIG. 1 is a schematic cross-sectional view of the ball joint according to the embodiment of the present disclosure. FIG. 1 is a cross-sectional view in which the dust cover and the like are cut along a plane including a central axis of a shaft of a ball stud provided in the ball joint. FIG. 2 is a partially enlarged cross-sectional view of the ball joint according to the embodiment of the present disclosure, and is a cross-sectional view in which a vicinity of a seal portion of the dust cover is enlarged.

The ball joint 10 includes a ball joint main body and a dust cover 100 attached to the ball joint main body. The ball joint main body includes a ball stud 300, a socket 200 which supports the ball stud 300 to be rotatable and swingable, and a knuckle 400 serving as a coupling member which is coupled to the shaft 310 of the ball stud 300. The dust cover 100 is made of an elastic material such as rubber.

The ball stud 300 has a spherical portion 320 at one end of the shaft 310. The socket 200 includes an annular case 210, a bottom plate 220 fixed to a bottom side of the case 210, and a bearing 230 for the spherical portion 320. The bearing 230 has a bearing surface 231 consisting of a spherical surface having the same diameter as a radius of curvature of the spherical portion 320. The knuckle 400 is coupled to the shaft 310 using a nut 500 on a side of the shaft 310 opposite to the spherical portion 320.

The ball joint 10 includes the dust cover 100 in order to prevent water, dust, and the like from entering a joint portion and to prevent grease from flowing out of the joint portion.

<Dust Cover>

Figure 3:
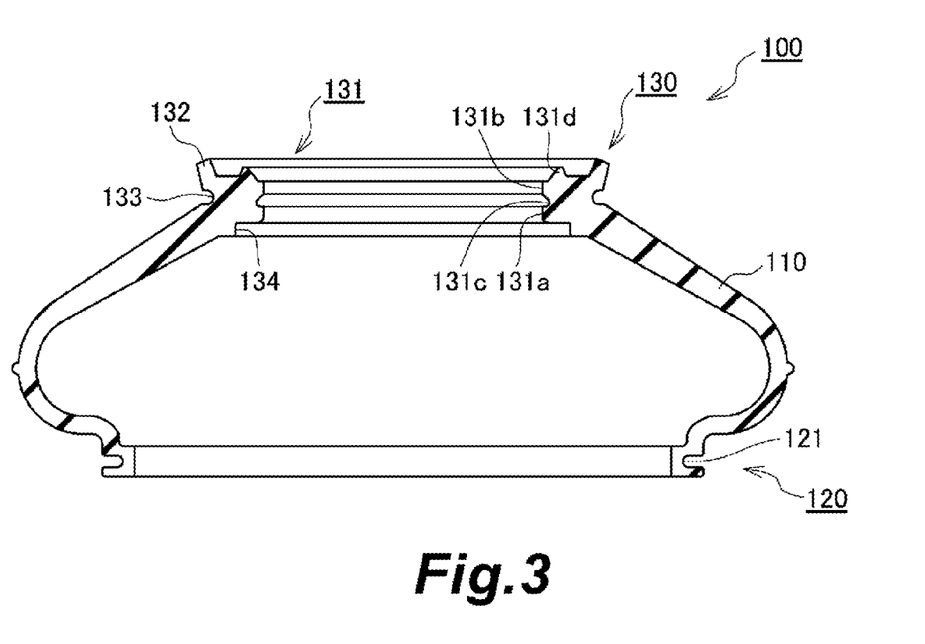
FIG. 3 is a schematic cross-sectional view of a dust cover according to an embodiment of the present disclosure.
Figure 4:
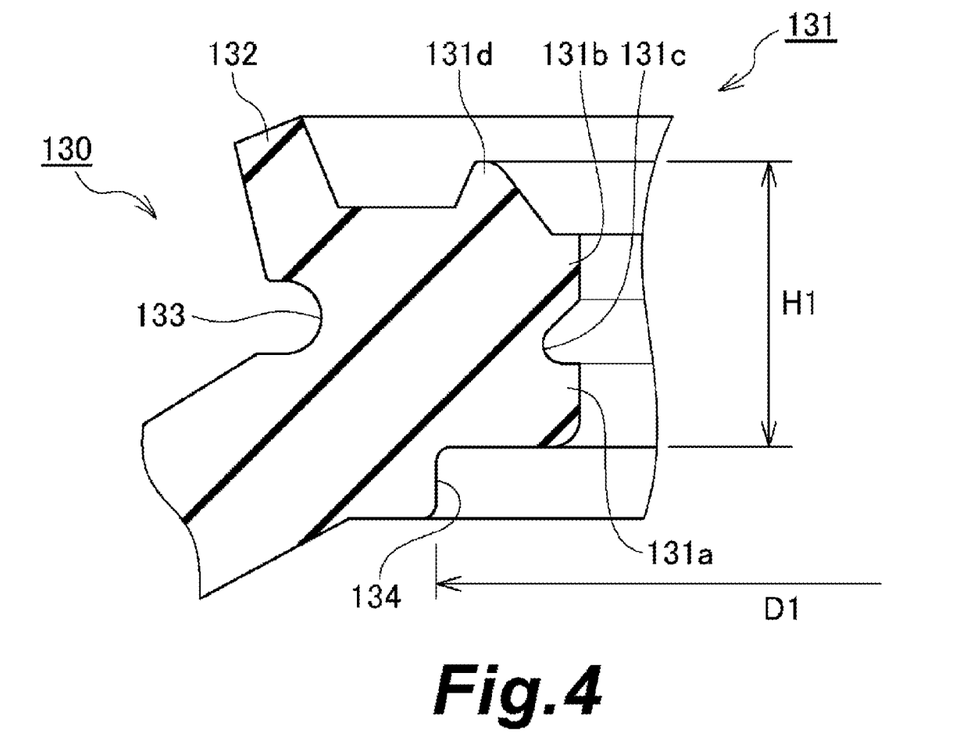
FIG. 4 is a partially enlarged cross-sectional view of the dust cover according to the embodiment of the present disclosure.

The dust cover 100 will be described with reference to FIGS. 3 and 4. FIG. 3 is a schematic cross-sectional view of the dust cover 100 according to the embodiment of the present disclosure. FIG. 3 shows a state in which no external force acts on the dust cover 100. When no external force acts on the dust cover 100, the dust cover 100 has a rotationally symmetric shape. FIG. 3 is a cross-sectional view of the dust cover 100 cut along a plane including the central axis of the dust cover 100 in a state in which no external force acts on the dust cover 100. FIG. 4 is a partially enlarged cross-sectional view of the dust cover 100 according to the embodiment of the present disclosure, and is a cross-sectional view in which a vicinity of the seal portion is enlarged.

The dust cover 100 includes a deformable film-shaped body portion 110, a fixed portion 120 which is provided on one end side of the body portion 110 and is fixed to the socket 200, and the seal portion 130 provided on the other end side of the body portion 110. The body portion 110 is configured such that a central portion thereof swells outward. An annular attachment groove 121 is provided on an outer circumferential surface side of the fixed portion 120. By attaching a fastener 600 to the attachment groove 121, the fixed portion 120 is fixed to an annular notch 211 formed at a tip of the case 210 of the socket 200 (see FIG. 1).

The seal portion 130 includes a main seal part 131 provided on an inner circumferential surface side thereof, a dust lip 132 provided on an outer circumferential surface side, an annular concave 133 provided near a base part of the dust lip 132 on the outer circumferential surface side, and a contact part 134 provided between the main seal part 131 and the body portion 110. The main seal part 131 includes a pair of annular inner circumferential surface side seal protrusions 131a and 131b that protrude radially inward, and an annular end surface side seal protrusion 131d provided on an end surface side thereof. An annular groove 131c is formed between the pair of inner circumferential surface side seal protrusions 131a and 131b.

<Ball Stud>

Figure 5:
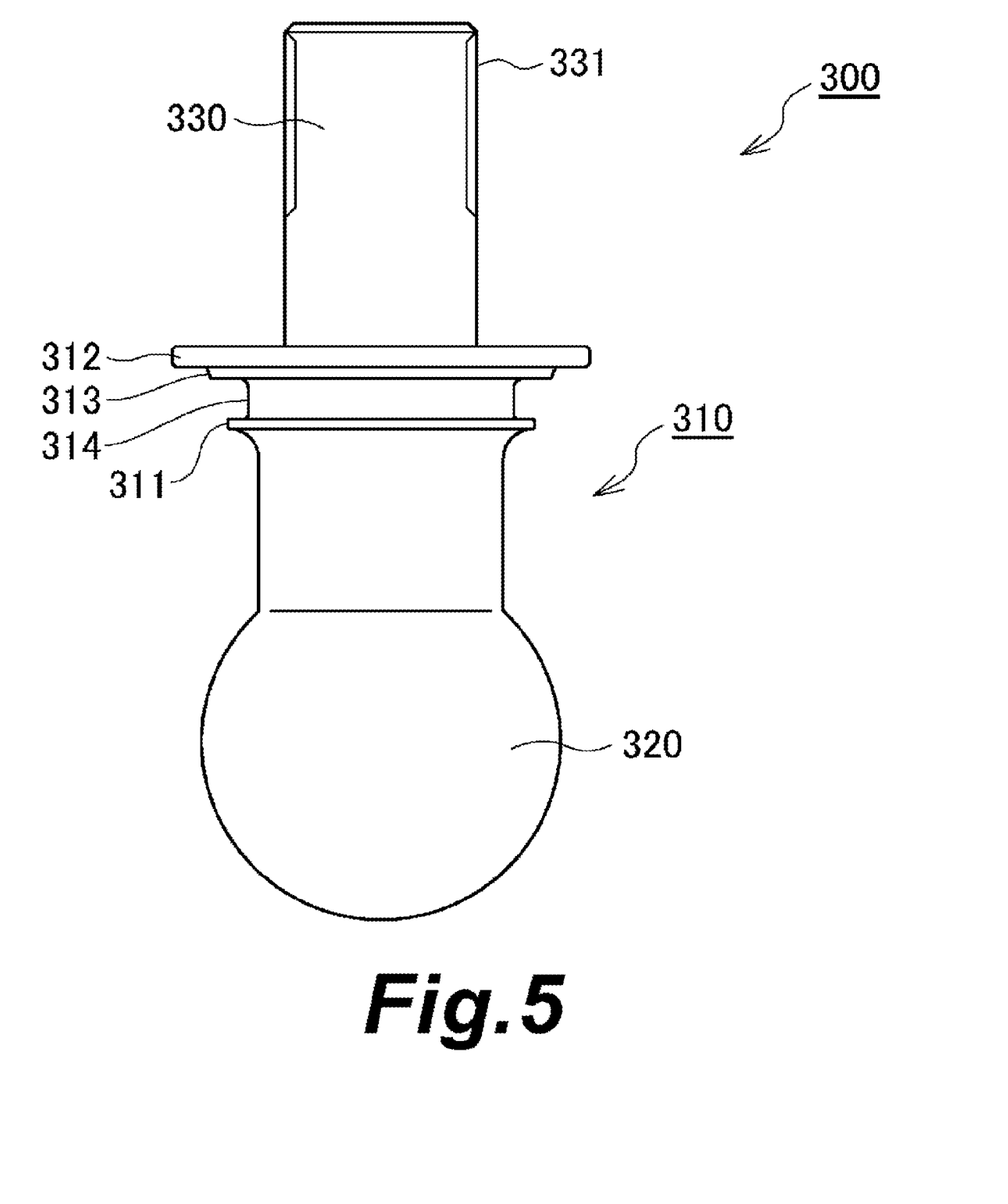
FIG. 5 is a front view of a ball stud according to an embodiment of the present disclosure.
Figure 6:
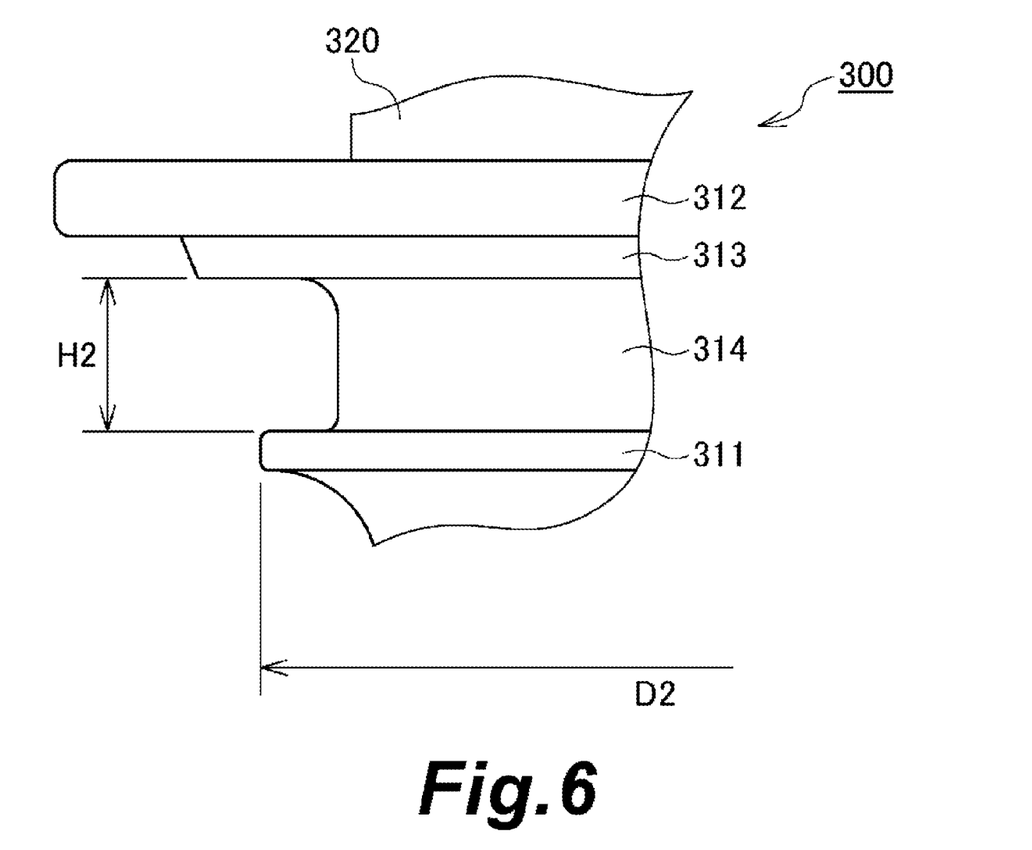
FIG. 6 is a partially enlarged view of the ball stud according to the embodiment of the present disclosure.

The ball stud 300 will be described with reference to FIGS. 5 and 6. FIG. 5 is a front view of the ball stud 300 according to the embodiment of the present disclosure. FIG. 6 is a partially enlarged view of the ball stud 300 according to the embodiment of the present disclosure.

The ball stud 300 has the shaft 310 and the spherical portion 320 provided at one end of the shaft 310. A male screw part 331 is formed on an outer circumferential surface of the other end portion 330 of the shaft 310. The nut 500 is fastened to the male screw part 331. The shaft 310 is provided with a first flange (a spherical portion side flange) 311 provided on the spherical portion 320 side, a second flange 312 and a third flange (an opposite side flange) 313 provided on a side opposite to the spherical portion 320 side across the first flange 311. The second flange 312 and the third flange 313 are provided to be adjacent to each other, and these constitute a stepped flange in which the latter has a smaller outer diameter. A part of the shaft 310 between the first flange 311 and the third flange 313 serves as a seal surface 314 in which the main seal part 131 of the dust cover 100 slides.

<Relationship Between Seal Portion of Dust Cover and Ball Stud>

A relationship between the seal portion 130 of the dust cover 100 and the ball stud 300 will be described with reference to FIGS. 1, 2, 4, and 6. In a state in which the dust cover 100 is attached to the ball joint main body, the main seal part 131 is provided to be slidable relative to the first flange 311 and the third flange 313 provided on the shaft 310 of the ball stud 300 while sandwiched therebetween. In the main seal part 131, the pair of inner circumferential surface side seal protrusions 131a and 131b provided to protrude radially inward come into slidable contact with an outer circumferential surface of the shaft 310 (at the seal surface 314). In the main seal part 131, an end surface side seal protrusion 131d provided to project toward the third flange 313 comes into slidable contact with an end surface of the third flange 313. The dust lip 132 of the seal portion 130 comes into slidable contact with an outer circumferential surface of the third flange 313. The contact part 134 of the seal portion 130 comes into slidable contact with an outer circumferential surface of the first flange 311.

A maximum length of the main seal part 131 in the central axis direction in a state in which no external force is applied thereto is defined as H1 (see FIG. 4). A distance between opposing surfaces of the first flange 311 (spherical portion side flange) and the third flange 313 (opposite side flange) is defined as H2 (see FIG. 6). These are set to satisfy H1>H2. Since the main seal part 131 is compressed by the first flange 311 and the third flange 313, it is more surely sandwiched by them.

An inner diameter of the contact part 134 in a state in which no external force is applied to the seal portion 130 is defined as D1 (see FIG. 4). An outer diameter of the first flange 311 (spherical portion side flange) is defined as D2 (see FIG. 6). These are set to satisfy D1<D2. Therefore, the contact part 134 comes into slidable contact with the outer circumferential surface of the first flange 311 with an interference.

The body portion 110 of the dust cover 100 configured as described above is deformed when the ball stud 300 swings relative to the socket 200 as indicated by an arrow P in FIG. 1. When the ball stud 300 rotates relative to the socket 200 as indicated by an arrow Q in FIG. 1, the seal portion 130 slides on the shaft 310 of the ball stud 300 and the like. As a result, the dust cover 100 provides a sealing function regardless of whether the ball stud 300 swings or rotates with respect to the socket 200.

Excellent Points of Ball Joint and Dust Cover According to Present Embodiment

The main seal part 131 of the dust cover 100 is sandwiched between the first flange 311 and the third flange 313 which are provided on the shaft 310 of the ball stud 300. Thus, even when a space of a part with which the main seal part 131 is in close contact is narrow, a sealing performance thereof is kept.

The main seal part 131 includes the pair of inner circumferential surface side seal protrusions 131a and 131b and the end surface side seal protrusion 131d. This provides the sealing function at both locations between the inner circumferential surface side seal protrusions 131a and 131b and the outer circumferential surface of the shaft 310, and between the end surface side seal protrusion 131d and the end surface of the third flange 313. Since the main seal part 131 is sandwiched by the first flange 311 and the third flange 313, separation of the inner circumferential surface side seal protrusions 131a and 131b from the outer circumferential surface of the shaft 310 is inhibited, and separation of the end surface side seal protrusion 131d from the end surface of the third flange 313 is inhibited.

Since the pair of inner circumferential surface side seal protrusions 131a and 131b are provided, the space (the space in a groove of the annular groove 131c) is formed between the pair of inner circumferential surface side seal protrusions 131a and 131b, and accordingly, even when the main seal part 131 is sandwiched between the first flange 311 and the third flange 313, the inner circumferential surface side seal protrusions 131a and 131b can be deformed to escape into the space. Therefore, deterioration of the sealing performance due to abnormal deformation of the main seal part 131 can be inhibited.

The annular concave 133 provided on an outer circumferential surface of the seal portion 130 can inhibit abnormal deformation of the dust cover 100 when the dust cover 100 is deformed such that a part of the body portion 110 on the outer circumferential surface side and the outer circumferential surface of the seal portion 130 come closer to each other as the ball stud 300 swings relative to the socket 200.

The contact part 134 of the seal portion 130 that comes into slidable contact with the outer circumferential surface of the first flange 311 achieves more stable sealing performance.

As described above, according to the ball joint 10 and the dust cover 100, a stable sealing function can be provided even when a space for disposing the dust cover 100 is narrow.

REFERENCE SIGNS LIST

10 Ball joint
100 Dust cover
110 Body portion
120 Fixed portion
121 Attachment groove 130 Seal portion
131 Main seal part
131a, 131b Inner circumferential surface side seal protrusion
131c Annular groove
131d End surface side seal protrusion
132 Dust lip
133 Annular concave
134 Contact part
200 Socket
210 Case
211 Notch
220 Bottom plate
230 Bearing
231 Bearing surface
300 Ball stud
310 Shaft
311 First flange (spherical portion side flange)
312 Second flange
313 Third flange (opposite side flange)
314 Seal surface
320 Spherical portion
330 Other end portion
331 Male screw portion
400 Knuckle
500 Nut
600 Fastener

The invention claimed is:

1. A ball joint comprising:
 a ball joint main body including:
  a ball stud which has a shaft and a spherical portion at one end of the shaft,
  a socket which has a bearing for the spherical portion and supports the ball stud to be rotatable and swingable, and
  a coupling member which is coupled to the shaft on a side opposite to the spherical portion; and
 a dust cover attached to the ball joint main body, wherein
 the shaft is provided with:
  a spherical portion side flange provided on a spherical portion side and
  an opposite side flange provided on a side opposite to the spherical portion side across the spherical portion side flange,
 the dust cover includes:
  a deformable body portion,
  a fixed portion which is provided on one end side of the body portion and is fixed to the socket, and
  a seal portion provided on the other end side of the body portion,
 the seal portion has a main seal part which is provided to the seal portion on an inner circumferential surface side to be in slidable contact with the spherical portion side flange and the opposite side flange while sandwiched and compressed therebetween, and
 a maximum length of the main seal part in a central axis direction in a state in which no external force is applied thereto is longer than a distance between opposing surfaces of the spherical portion side flange and the opposite side flange, where the central axis direction is a direction in which a central axis of the dust cover extends in a state in which no external force is applied thereto, wherein
 the main seal part includes:
  a pair of inner circumferential surface side seal protrusions which protrude radially inward and come into slidable contact with an outer circumferential surface of the shaft; and
  an end surface side seal protrusion which protrudes toward the opposite side flange and comes into slidable contact with an end surface of the opposite side flange such that the end surface side seal protrusion and the end surface of the opposite side flange are in contiguous contact around an entire circumference of the shaft.

2. The ball joint according to claim 1, wherein
 a dust lip is provided to the seal portion on an outer circumferential surface side, and
 an annular concave is recessed relative to the outer circumferential surface side of the seal portion, and is provided to the seal portion on the outer circumferential surface side near a base part of the dust lip.

3. The ball joint according to claim 1, wherein
 the seal portion has a contact part between the main seal part and the body portion, the contact part having an inner diameter smaller than an outer diameter of the spherical portion side flange in a state in which no external force is applied thereto and being configured to come into slidable contact with an outer circumferential surface of the spherical portion side flange.

4. A dust cover configured to be attached to a ball joint main body,
 the ball joint main body including:
  a ball stud which has a shaft and a spherical portion at one end of the shaft,
  a socket which has a bearing for the spherical portion and supports the ball stud to be rotatable and swingable, and
  a coupling member which is coupled to the shaft on a side opposite to the spherical portion,
 the shaft being provided with:
  a spherical portion side flange provided on a spherical portion side and
  an opposite side flange provided on a side opposite the spherical portion side across the spherical portion side flange, and
 the dust cover comprising:
  a deformable body portion;
  a fixed portion which is provided on one end side of the body portion and is configured to be fixed to the socket; and
  a seal portion provided on the other end side of the body portion, wherein
 the seal portion has a main seal part which is provided to the seal portion on an inner circumferential surface side and configured to be slidable relative to the spherical portion side flange and the opposite side flange while sandwiched and compressed therebetween, a dust lip provided to the seal portion on an outer circumferential surface side, and an annular concave that is recessed relative to the outer circumferential surface side and is provided to the seal portion on the outer circumferential surface side near a base part of the dust lip, and
 a maximum length of the main seal part in a central axis direction in a state in which no external force is applied thereto is configured to be longer than a distance between opposing surfaces of the spherical portion side flange and the opposite side flange of the ball joint main body, in which the dust cover is configured to engage, where the central axis direction is a direction in which a central axis of the dust cover extends in a state in which no external force is applied thereto, wherein the main seal part includes:
- a pair of inner circumferential surface side seal protrusions which protrude radially inward and are configured to come into slidable contact with an outer circumferential surface of the shaft; and
- an end surface side seal protrusion which is configured to protrude toward the opposite side flange and is configured to come into slidable contact with an end surface of the opposite side flange, and wherein a distance between a radial outermost portion of the dust lip on the outer circumferential surface side and the deformable body portion is greater than a distance between the end surface side seal protrusions and the deformable body portion.

5. The dust cover according to claim 4, wherein
the seal portion has a contact part between the main seal part and the body portion, the contact part being configured to have an inner diameter smaller than an outer diameter of the spherical portion side flange in a state in which no external force is applied thereto and being configured to come into slidable contact with an outer circumferential surface of the spherical portion side flange.

* * * * *